July 5, 1949.　　　　S. GOLDEN　　　　2,475,387
ORDNANCE PRESSURE TIME RECORDER
Filed Nov. 2, 1945
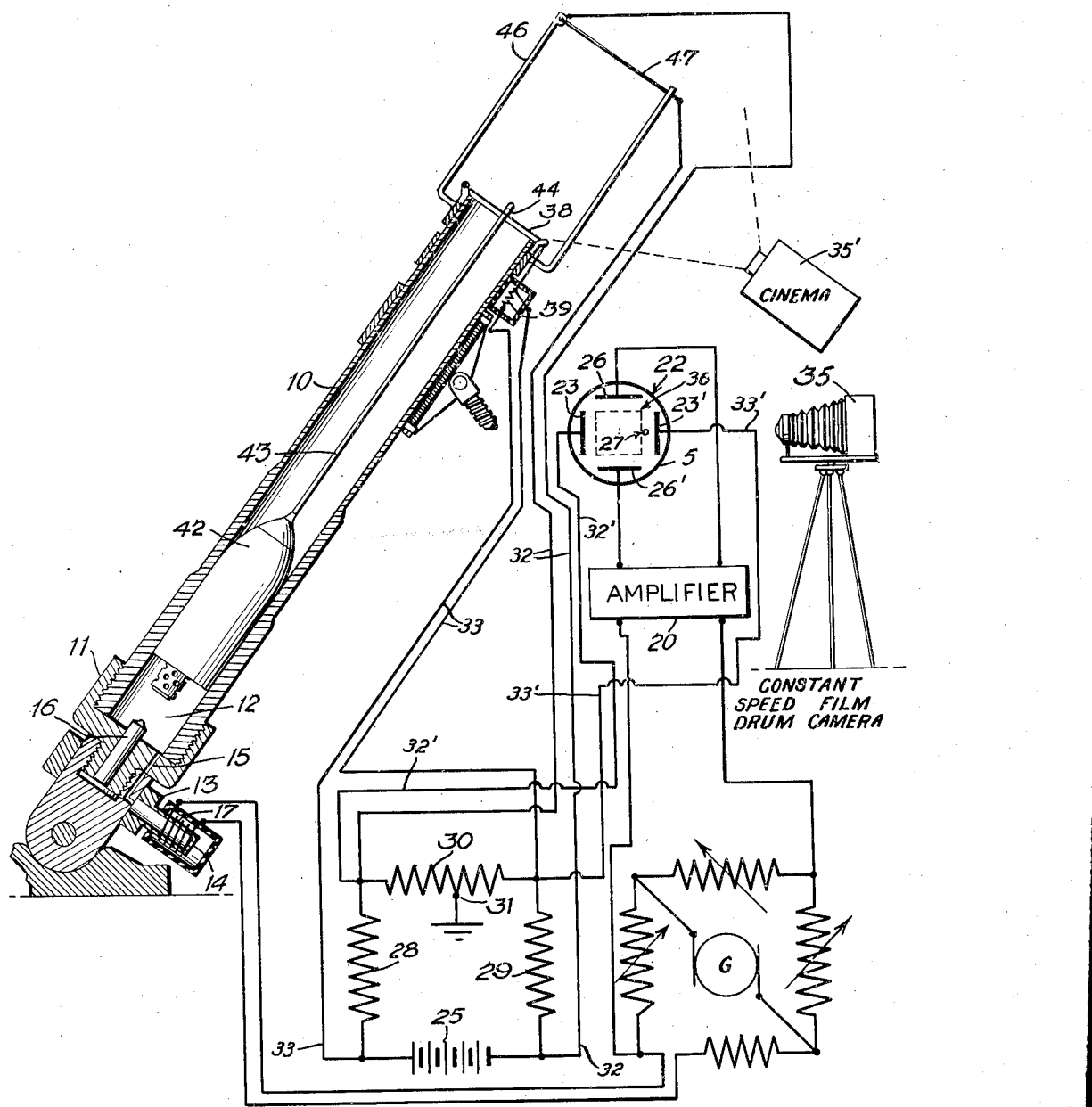
Inventor
Sidney Golden
By J. H. Church & W. E. Thibodeau
　　　　　　Attorney Patented July 5, 1949

2,475,387

UNITED STATES PATENT OFFICE 2,475,387

ORDNANCE PRESSURE TIME RECORDER

Sidney Golden, Cumberland, Md., assignor to the United States of America as represented by the Secretary of War Application November 2, 1945, Serial No. 626,374

3 Claims. (Cl. 73—167)

This invention relates to pressure-travel gages and more particularly to pressure-travel gages adapted to obtain simultaneous records of the pressure-time travel relations of a projectile within the barrel of an ordnance piece.

The pressure-travel gage of the type to which this invention relates consists essentially of a resistance strain gage connected into one arm of a balanced Wheatstone bridge. The output of the bridge circuit is amplified and applied to a pair of deflecting plates of a cathode ray oscilloscope. The deflection of the electron beam of the oscilloscope is thus a function of the pressure applied to the strain gage. The preferred form of strain gage consists essentially of a high resistance wire wound on a hollow cylinder. The cylinder is mounted on the ordnance piece and connected to the firing chamber so that the propellant gas pressure will be transmitted into it, expanding the cylinder and as a result, the attached strain gage, thereby changing its resistance. The pressure-time record is obtained by photographing the deflection of the cathode beam on a film which is driven at constant speed to give the required time axis.

A record of the travel of the projectile through the barrel is obtained by separately photographing at high cinema speeds, the position, relative to the muzzle, of a stick which is attached to the nose of the projectile. By correlating the time scale of the projectile movement thus recorded and the time scale of the cathode ray deflection shown on the constant speed film, the desired relation between pressure and travel for a common time axis may be obtained.

In prior attempts to secure pressure-time records of projectiles utilizing cinema apparatus, unsatisfactory results were attributable primarily to difficulty in timing the shutter action on the camera, the duration of the event for which a pressure-time record is desired being of the order of 10 milli-seconds. Since this interval requires a drum period of about 37 milli-seconds to give suitable records, it is apparent that difficulties would naturally attend mechanical control of the shuttering mechanism on a camera required to photograph at high speed, events of such short duration.

Consequently, it is the principal object of this invention to provide a pressure-travel recording mechanism with a projectile-actuated switching arrangement for maintaining an oscilloscope beam in a non-recording side position at all times except during the period of the event to be recorded by the photographing of the deflection of the oscilloscope beam. By virtue of this switching arrangement the operator is able to open and close the shutter of the drum camera by hand or otherwise at a convenient interval before and after recording the event.

It is also an object of this invention to provide a switching circuit for an oscilloscope, which is controlled by the travel of the projectile in the barrel of an ordnance piece whereby oscilloscope records may be obtained for a selected travel distance of the projectile within the barrel.

The specific nature of the invention as well as other objects and advantages thereof will clearly appear from a description of a preferred embodiment as shown in the accompanying drawings in which:

The figure is a longitudinal sectional view of an ordnance piece assembled with attachments for obtaining pressure-travel data, including a schematic view of the electrical circuit utilized.

As illustrated in the drawings, a mortar consisting of a tube 10 and a breech cap 11, together defining a firing chamber 12, is provided with an adapter 13 by means of which a pressure cylinder 14 is secured to the mortar. A firing pin 16 is provided in breech cap 11. Adapter 13 has a passageway 15 leading from firing chamber 12 to pressure cylinder 14.

A pressure gage 17, consisting of a coil of high resistance wire wound around pressure cylinder 14, is connected into one arm of a Wheatstone bridge circuit as shown in the figure. The gage 17 is of a well known type wherein deformation of cylinder 14 by internal pressure deformed the surrounding wire, changing its resistance. The output of the bridge circuit is fed into a suitable amplifier 20, the amplified impulse is fed into a cathode ray oscilloscope 22, being impressed across vertical deflecting plates 26 and 26', respectively.

The negative and positive terminals of a direct current potential source, such as a battery 25, are initially connected respectively and directly to the left and right horizontal deflecting plates 23 and 23' by conductors 32—32' at one side and 33—33' at the other side of the battery. These conductors also include severable links 47 and 39 therein as will be described. In addition, a series resistance circuit having two legs with resistors 28 and 29 respectively and a bridging resistor 30 therebetween, is also connected between the terminals of the battery, so that a current flows in series through these three resistors. Between the bridging resistor 30 and the adjacent resistors 28 and 29, connections are also made with the final leads 32'—33' of the conductors 32 and 33, and so with plates 23 and 23', but with polarity the reverse of the direct connections, so that the voltage derived across resistors 28 and 29, at the plates 23 and 23' tend to produce a swing of the electron beam 27 in a direction opposite that produced by the direct connections first mentioned. The leads 32' and 33' are virtually taps from the junctions between end resistor elements 28 and 29 and the central resistor element 30. It may be understood that due to the current in the resistance circuit, and the drops across 28 and 29, the potential and effect of the direct connections will predominate over the potential and effect derived across the resistors 28 and 29, so that in the initial condition stated, the electron beam 27, may be caused to swing to an extreme position near the plate 23', by establishment of proper values in the resistors. This initial position of the beam 27 is intended to be outside the field 36 included by the camera 35 set up to photograph the trace produced by the electron beam on the screen 5 of the oscilloscope. If the link 39 is broken the beam may assume an intermediate position further from the plate 23', and when the link 47 is also broken, the beam may be swung to an extreme the opposite of the one initially established.

Owing to the use of the velocity of a continuously moving photo film in the camera 35 to establish a time base, as above mentioned, no great swing of the beam horizontally is required, and the degree of such displacement is not important, except to insure its movement into the field of the camera 35 during electrical manifestations derived from the strain gage 17.

A ground 31 is shown connected midway of the resistance 30, which has no material effect on the deflection functions of the circuits described. Its purpose is that usual in oscilloscope deflection circuits—to establish a mean potential level of the deflection system which is common with that of the grounded anode of the oscilloscope gun (not shown in this application), and so avoiding requirement for high insulation of the deflection system.

A cord 38 is strung across the muzzle of the barrel 10, one end being attached securely to the mortar barrel 10, and the other end to the breakable link 39, consisting of a section of insulated small size wire of relatively low electrical resistance. This breakable link is connected by conductors 33—33' between the positive terminal of the battery 25 and the deflecting plate 23' of the cathode ray oscilloscope.

A mortar shell 42 is provided with a stick 43 secured rigidly in coaxial relation in the nose, the stick being long enough to project out of the mortar tube 10 when the shell is at the bottom of it. This stick 43 has a transversely extending cross pin 44 which is adapted to engage cord 38 on the downward movement of the projectile in the mortar tube, thereby breaking link 39.

A yoke 46 is provided extending forwardly from the muzzle end of mortar tube 10 and mounted thereon is the second breakable link 47 insulated from the yoke 46 and extending between the arms of the yoke in the path of the main portion of the shell at about a shell's length from the muzzle, so that the rupture of breakable link 47 by the nose of the shell will occur just as the base of the shell clears the muzzle. This breakable link 47 is connected by connectors 32—32' between the negative terminal of battery 25 and deflecting plate 23.

Thus a circuit is produced wherein a deflecting voltage sufficient to deflect the electron beam to a non-recording position is applied to horizontal plates 23 and 23' when both links 39 and 47 are conducting, or when both links 39 and 47 are broken and non-conducting. When only link 39 is broken, there is zero voltage applied to plates 23 and 23' and the electron beam occupies a central position wherein it can be recorded by camera 35.

In operation the projectile or shell is inserted in the mortar tube 10 and held by stick 43 while cord 38 is fastened to breakable link 39, and breakable link 47 is fastened in place across yoke 46. The negative terminal of the battery is now connected to the deflecting plate 23 through breakable link 47 and the positive terminal to the deflecting plate 23' through breakable link 39 so that the electron beam is deflected to the right to a non-recording position as long as both breakable links are intact or both are broken, but with only one link broken and the other intact the electron beam moves into the field of the camera 35.

The camera shutter (not shown) is now opened and the stick 43 which is secured to shell 42 is released, the shell drops to the bottom of mortar tube 10 and cross pin 44 thereon engages cord 38 and breaks link 39. This interrupts connector 33 forming part of the direct connection between the positive terminal of the battery and the plate 33', with the result that the positive potential is now removed from the latter and the electron beam permitted to move inwardly toward the center of the screen 5 and into the field of view of the camera 35.

The continued downward movement of the shell within the mortar barrel causes the firing pin 16 to engage the percussion cap in the shell and ignite the propellent charge. The gas generated by the burning propellant builds up a pressure behind the shell, propelling it forward in the barrel and simultaneously expanding through passage 15 into pressure cylinder 14 which as a result of the pressure expands and thereby deforms pressure gage 17 thus unbalancing the bridge circuit and causing the electron beam to be deflected vertically an amount functionally related to the magnitude of the pressure in the cylinder.

This vertical deflection of the beam forms a trace on the fluorescent screen and is photographed as a continuous line on a high speed film in the camera 35 as the shell moves up through the barrel. Simultaneously the travel of the shell is recorded by photographing the movement of stick 43 by a second camera. As the base of the shell leaves the mortar barrel the nose engages and breaks the wire 47 thereby interrupting the direct connection 32 between the negative terminal of battery 25 and the deflecting plate 23. Upon the rupture of this circuit, the potential of the battery is applied through the resistors 28 and 29 to the horizontal deflecting plates 23 and 23' to deflect the beam to the left out of the field of view of the camera. The result is that the camera has recorded the vertical deflection of the beam over the interval of travel of the projectile from about one inch above the firing pin down to the bottom and back up to the point where the base of the projectile is leaving the muzzle of the mortar and without the necessity of precisely timed shuttering of the camera drum. The record by the second camera will show the correlated positions of the projectile at which the varying pressures recorded at 35 are manifest. It will be understood how the record of the positions of the projectile and the record of pressures can be protracted to a common base, and so a direct reading of pressure and position obtained for the full path of the projectile in the ordnance piece.

A moderately heavy wire is required in the breakable link 47 because the recoil begins considerably before the shell leaves the mortar and unless a heavy wire is used and is securely fastened, both mechanically and electrically to the yoke 46, the high acceleration involved may cause the wire to be broken at its connection with the yoke 46 thus prematurely opening the second leg of the switching arrangement.

It is thus apparent that this invention provides an improved projectile-actuated switching arrangement for a pressure-travel recording mechanism for maintaining an oscilloscope beam in a non-recording side position at all times except during the period of the event to be recorded.

I claim:

1. In an apparatus for obtaining pressure-time records within the propellent chamber of muzzle loaded ordnance, in combination, a cathode ray oscilloscope, means responsive to pressure within said ordnance for vertically deflecting the electron beam thereof, means for horizontally deflecting said beam to a position out of the field of view of said oscilloscope, a first means responsive to the entry of a projectile on loading of said ordnance for rendering inoperative said horizontal deflecting means, and a second means responsive to the entry of said projectile within said ordnance for rendering effective said horizontal deflecting means, whereby said beam will be within the field of view of said oscilloscope.

2. In combination with a barrel for muzzle loaded ordnance, means for deriving a potential having a magnitude which is a function of the pressure within said barrel, a cathode ray oscilloscope having a pair of vertical and horizontal deflecting plates, means for applying the said derived potential to one pair of deflecting plates, a source of direct current potential, means connecting at least a portion of said direct current potential to said other pair of deflecting plates to move the ray to a non-visible position in the field of view of said oscilloscope, means responsive to the entry of a projectile to the ordnance incident to loading of the latter for removing at least a portion of the potential applied to said last named pair of plates to move said ray to a visible position in the field of view of said oscilloscope means, and means responsive to the travel of said projectile within said barrel on firing for again applying at least said portion of said direct current potential to said plates to deflect said ray to a non-visible position.

3. In an ordnance firing test device, an oscilloscope deflecting circuit including opposed deflector means, a direct current potential source, a series resistance circuit connected across its potentials including three resistor elements, taps from said circuit intermediate respective end resistor elements and the central one to respective deflector means, and direct connectors extended from the opposite poles of said source to the deflector means with potentials opposed to those of said taps, and respective circuit breakers in each of said direct connectors, one responsive to an initial stage of an ordnance firing, and the other responsive to a final stage in such firing.

SIDNEY GOLDEN.

REFERENCES CITED

The following references are of record in the file of this patent:

UNITED STATES PATENTS

| Number | Name | Date |
| --- | --- | --- |
| 1,489,566 | Webster | Apr. 8, 1924 |
| 1,818,760 | Selengi | Aug. 11, 1931 |
| 2,186,268 | Pakala | Jan. 9, 1940 |
| 2,251,332 | Gray | Aug. 5, 1941 |
| 2,446,537 | Hickman | Aug. 10, 1948 |